(12) United States Patent
Pohlmann et al.

(10) Patent No.: US 6,446,136 B1
(45) Date of Patent: Sep. 3, 2002

(54) SYSTEM AND METHOD FOR DYNAMIC CORRELATION OF EVENTS

(75) Inventors: William N. Pohlmann, Newtown Square, PA (US); Kenneth D. Matson, Bellevue, WA (US); Paul Cantrell, Sudbury, MA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/224,487

(22) Filed: Dec. 31, 1998

(Under 37 CFR 1.47)

(51) Int. Cl.[7] .................................................. G06F 9/44
(52) U.S. Cl. ..................................... 709/318; 707/104.1
(58) Field of Search ......................... 709/318, 310–332, 709/224, 202, 204

(56) References Cited

U.S. PATENT DOCUMENTS

| | | | | |
|---|---|---|---|---|
| 5,063,523 A | * | 11/1991 | Vrenjak ....................... | 709/223 |
| 5,165,018 A | * | 11/1992 | Simor ......................... | 709/222 |
| 5,459,717 A | * | 10/1995 | Mullan et al. ................ | 370/351 |
| 5,528,516 A | * | 6/1996 | Yemini et al. ................ | 702/181 |
| 5,661,668 A | * | 8/1997 | Yemini et al. ................ | 702/186 |
| 5,809,238 A | * | 9/1998 | Greenblatt et al. .......... | 709/202 |
| 5,870,605 A | * | 2/1999 | Bracho et al. ............... | 709/318 |
| 5,872,931 A | * | 2/1999 | Chivaluri .................... | 709/223 |
| 5,881,315 A | * | 3/1999 | Cohen ......................... | 710/52 |
| 5,974,417 A | * | 10/1999 | Bracho et al. ................ | 707/10 |
| 6,021,443 A | * | 2/2000 | Bracho et al. ............... | 709/241 |
| 6,108,700 A | * | 8/2000 | Maccabee et al. ........... | 709/224 |
| 6,148,338 A | * | 11/2000 | Lachelt et al. ............... | 709/224 |
| 6,216,132 B1 | * | 4/2001 | Chandra et al. ......... | 707/103 R |
| 6,272,537 B1 | * | 8/2001 | Kekic et al. ................. | 709/223 |
| 6,289,384 B1 | * | 9/2001 | Whipple et al. ............. | 709/229 |

OTHER PUBLICATIONS

Thrampoulidis et al. Object interaction diagram: a new technique in object–oriented analysis and design, Journal of Object–Oriented Programming, vol. 8, No. 3, Jun. 1995, pp. 25–32.

Rosenblum et al "A design framework for internet–scale event observation and notification", ACM SIGSOFT Software Engineering Notes, vol. 22, Issue 6, Nov. 1997.*

Thrampoulidis et al., "Object interaction diagram: a new technique in object–oriented analysis and design," Journal of Object–Oriented Programming, vol. 8, No. 3, pp. 25–32, Jun. 1995.*

* cited by examiner

Primary Examiner—St. John Courtenay, III
(74) Attorney, Agent, or Firm—Baker & McKenzie (57) ABSTRACT

An event management system including an event manager, an alarm rule store, an event correlator, and a response engine. The event manager provides and receives events. The event correlator correlates at least one of the events provided by the event manager based on the alarm rules stored in the alarm rule store. The response engine executes a response policy based on the correlation of events by the event correlator.

11 Claims, 5 Drawing Sheets

SYSTEM AND METHOD FOR DYNAMIC CORRELATION OF EVENTS

FIELD OF THE INVENTION

The present invention relates to the field of event management systems, in particular to dynamic correlation of events.

BACKGROUND INFORMATION

Information technology (IT) has evolved from mainframe-only computing to complex, highly distributed computer systems spanning across desktops and departments through networks. These distributed computing environments provide benefits, including the flexibility to select any number of platforms, domains, tools, and network configurations. The distributed environments, however, may be complex. Further, there may exist a lack of compatibility and integration between software tools and platforms. For example, conventional point products (e.g., the Platinum DBVision product manufactured by Platinum technology, inc. of Oakbrook Terrace, Ill.) are generally directed to a specific function or area of expertise such as a solution for database monitoring and management, job scheduling, or managing database reorganizations. Each point product provides a specific capability and each also includes a distinct interface. On the other hand, utilizing framework technology provides an integrated solution, although tool functionality is significantly sacrificed. Further, maintaining the current enterprise environment utilizing either conventional point products or framework technology involves a large amount of resources and money from IT organizations.

Accordingly, a need exists for an integrated system for providing tools that utilize a compatible interface without significantly sacrificing tool functionality.

SUMMARY OF THE INVENTION

An object of the present invention is providing an integrated system for monitoring events occurring in point products through a common event management system.

Another object of the present invention is the dynamic correlation of events across nodes of an enterprise.

It is still another object of the present invention to dynamically execute a changed rule and/or a newly added rule for event correlation.

An aspect of the present invention provides an event management system including an event manager, an alarm rule store, an event correlator, and a response engine. The event manager receives and distributes event information. The event correlator correlates event information provided by an event manager based on alarm rules which are stored in an alarm rule store. The response engine executes a response policy based on the correlation of events by the event correlator.

Another aspect of the present invention provides a method for dynamically executing a modified rule or a new rule for event correlation. The method further includes comparing a first rule set to a second rule set to identify modifications, additions, or deletions of rules and dynamically executing all of the respective rules that have been modified or added.

DETAILED DESCRIPTION

Figure 1:
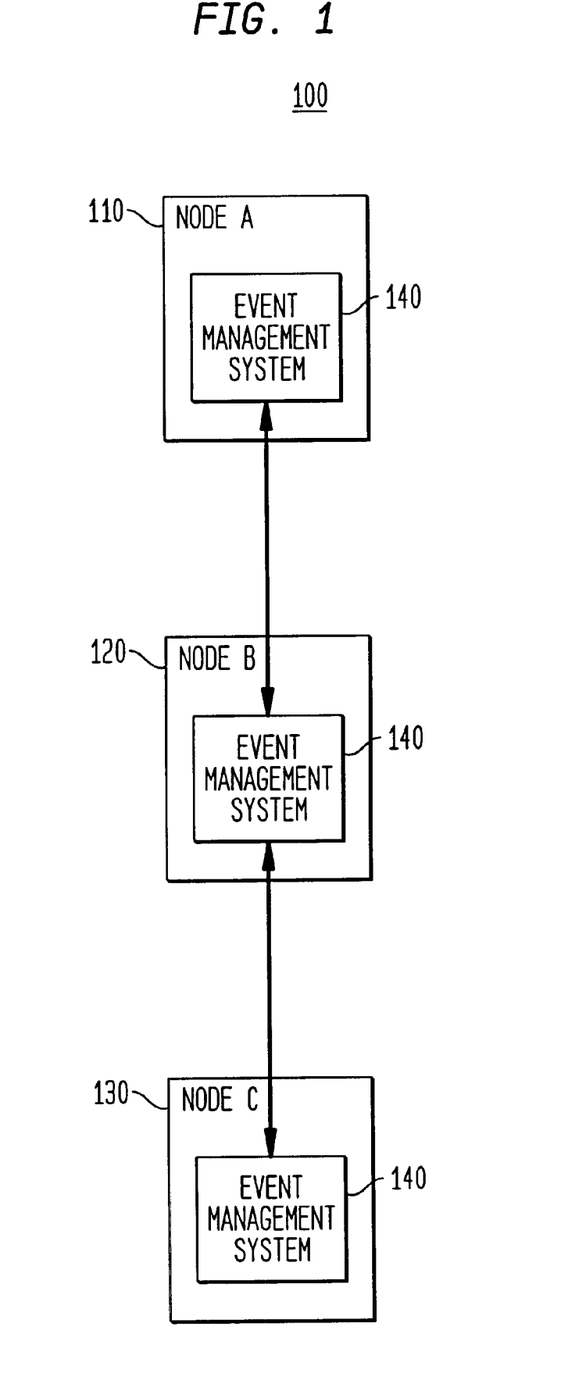
FIG. 1 shows an exemplary embodiment of an enterprise of the present invention including a plurality of nodes.

The event management system of the present invention manages an enterprise (e.g., a computer network such as a local area network (LAN) or wide area network (WAN)), correlates event information occurring in the enterprise, and takes corrective actions based on predetermined response policies. The event management system receives, for example, event messages from compatible point products within the enterprise. As shown in FIG. 1, the enterprise 100 may include a plurality of nodes 110, 120, 130 which may, for example, be connected by a network (not shown). A node is, for example, a physical box such as a personal computer, server, etc. that runs an operating system. In an exemplary embodiment of the present invention, a node may be a personal computer having a compatible point product installed on it. In an exemplary embodiment of the present invention, the event management system 140 manages events on the nodes 110, 120, 130 where the events are generated, minimizing the movement of data on the network and keeping actions such as evaluation, reporting and automated correction of data close to the source.

Figure 2:
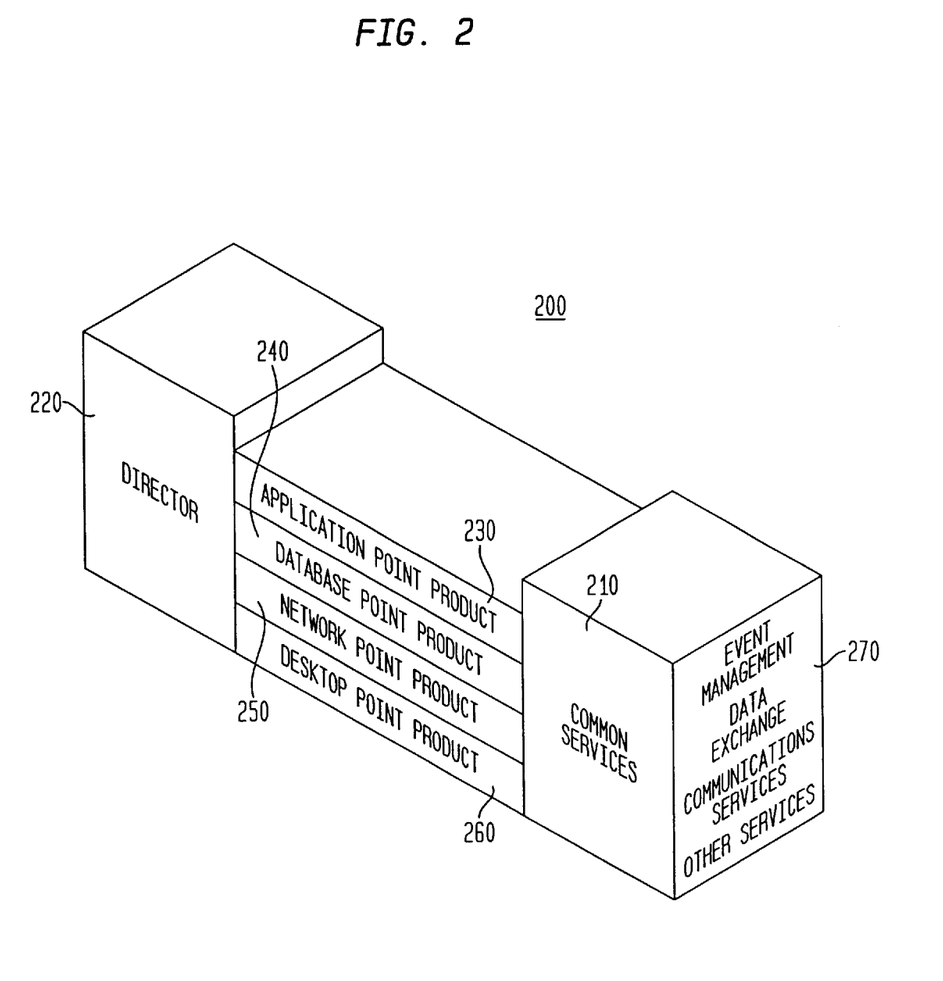
FIG. 2 shows an exemplary embodiment of a suite of integrated point products of the present invention.

In an exemplary embodiment of the present invention as shown in FIG. 2, the event management system 270 may be included in a suite 200 of integrated tools including compatible point products used to, for example, manage applications, databases, desktops, networks, and systems. The tools 230, 240, 250, 260 may use a set of common services 210 to share data relating to events. A director 220 is, for example, a shared, common graphical user interface (GUI) running in a conventional server computer for compatible point products 230, 240, 250, 260. In an exemplary embodiment of the present invention, the director 220 runs under Windows NT and Windows 95, and operates as a single console that allows users to view and interact with all resources including compatible point products 230, 240, 250, 260 in the enterprise.

The primary manageable unit of information utilized by the event management system of the present invention is a structured message called an event. An event represents information about some significant occurrence by or to a resource in the enterprise. Events are sent and received by compatible point products and event managers in the event management system. Events are, for example, the basic building blocks of real-time information processing used to manage the enterprise. Events define the fundamental element of publishable, sharable information and the format in which the events should be maintained and transmitted. The structure of an event includes, for example, predefined fields for the fundamental information necessary for any event record. The predetermined fields fall into two categories: identifying fields and non-identifying fields. Identifying fields are fields that taken together form a unique key for the event, distinguishing it from another event. Non-identifying fields are fields that add additional information about an event but do not participate in the key of the event. The event management system of the present invention allows the event structure to be extended by a user by dynamically adding key value pairs and thus, uniquely defining the respective event structure. Accordingly, the addition of key value pairs to an event structure enables a point product to publish the uniquely-defined event that otherwise would not have been published because it would not have been uniquely defined by the predetermined fields of the event.

An exemplary embodiment of an event structure according to an embodiment of the present invention is defined below, for example, in the C language.

```
typedef struct_PT_EVENT
{
int             Version;       /* Event structure version */
PT_CHAR_T       *Node;          /* Node of event */
PT_CHAR_T       *Class;         /* Event class */
PT_CHAR_T       *Instance;      /* Originating product instance */
PT_CHAR_T       *Name;          /* Event name */
PT_CHAR_T       *Time;          /* Event time (yyyymmdd hh24miss) */
PT_CHAR_T       *CondTime;      /* Condition time (yyyymmdd hh24miss) */
PT_CHAR_T       *AgentNode;     /* Node where detecting agent is running */
PT_CHAR_T       *EvmgrNode;     /* Node where responsible event mgr runs */
PT_EVENT_TYPE   Type;           /* Event type (EV_DISCRETE...) */
PT_RESP_TYPE    Response;       /* Response type (EVRE_SILENCE...) */
PT_CHAR_T       *RespPolicy;    /* Response Policy */
PT_CHAR_T       *Descr;         /* Description */
PT_CHAR_T       *DescrId;       /* Message string key for MsgPut */
PT_CHAR_T       *DescrFields;   /* Field list for substitution in message */
double          Value;          /* Value (for condition/alarm events) */
int             Level;          /* Alarm level (for type=EV_ALARM_SET) */
PT_CHAR_T       *IntKeys;       /* Application specific internal keys */
int             NumKey;         /* Number of key/value pairs following */
PT_CHAR_T       **Keys;         /* Array of other key (attribute) names */
PT_CHAR_T       **Values;       /* Array of other key(attribute) values */
BOOL            Archived;       /* Boolean flag, TRUE if event archived */
PT_CHAR_T       *Id;            /* Unique event id */
PT_CHAR_T       *CondId;        /* Condition id */
int             RepeatCount;    /* Count of duplicate events of this type used for storm suppression */
int             HopCount;       /* Here comes Peter Cotton Tail... */
PT_CHAR_T       *GMTOffset;     /* GMT Offset */
int             ActionTaken;    /* Boolean flag, Response action in progress */
```

-continued

```
BOOL            Silenced;       /* Boolean flag, Alarm silenced */
PT_CHAR_T       *ProductName;   /* Product name of submitting product */
PT_CHAR_T       *InstanceType;  /* Type of instance in Instance */
void            *localParam;    /* Hook to allow local associated data with event */
PT_CHAR_T       *AuthString;    /* Placeholder for authorization string, some form of event content signature */
PT_CHAR_T       *TTId;          /* Trouble ticket id */
PT_CHAR_T       *TTStatus;      /* Trouble ticket status */
}_PT-EVENT;
```

The identifying fields of the exemplary event are node, name, product, instance, type, condition_time if the type is not discrete, event time if the type is discrete, all key value pairs including the contents of the keys field array and values field array (with the field, for example NumKeys, including a number indicating the number of key value pairs in their respective field arrays). All of the other predefined fields are non-identifying fields.

The events may be categorized into a plurality of types including, for example, discrete events, conditions and alarms. Discrete events are events which indicate that something occurred at a particular time and are completely self-contained. The occurrence for a discrete event has no state and does not get updated. A failed logon attempt, for example, may invoke the generation of a discrete event. Conditions are events that indicate the state of something that is persistent over a period of time and may have attributes that are updated. The events declared by a product are owned by that product. Generally, only the respective point product can update or clear the condition events generated at the point product. The contents of discrete and condition events represent real information about the enterprise that cannot be changed without changing the occurrence that causes the event. An alarm is, for example, an interpretation of other events based on a user configurable policy. Accordingly, the user could clear an alarm at anytime without resolving the condition that caused it. Similarly, the alarm can persist beyond the clearing of an event upon which the alarm is based.

Figure 3:
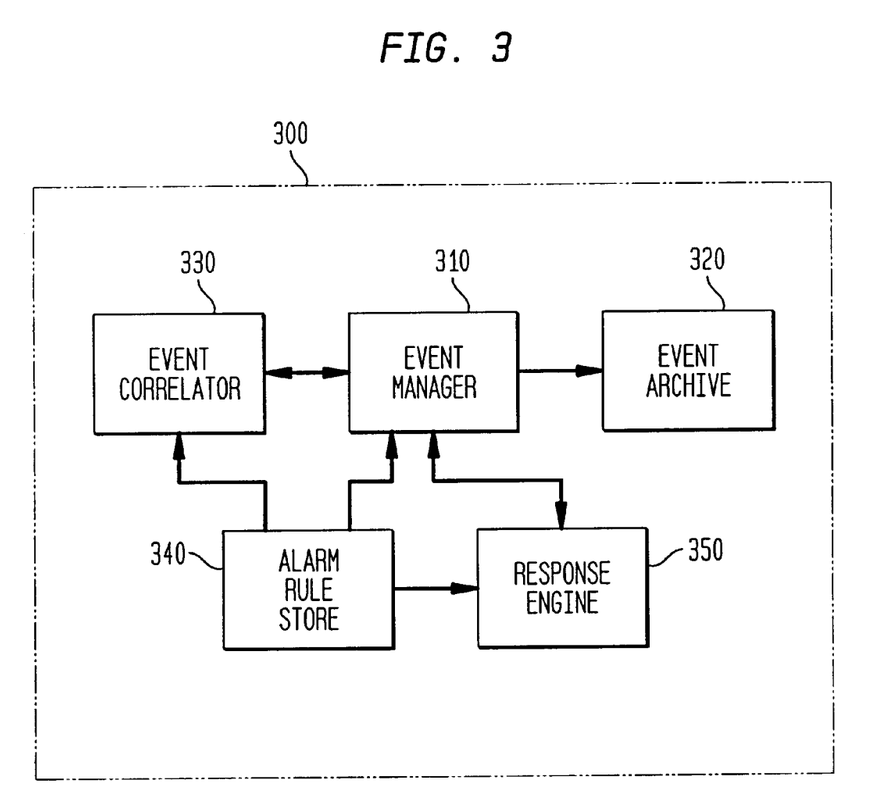
FIG. 3 shows an exemplary embodiment of a block diagram of an event management system of the present invention.

As shown in FIG. 3, an exemplary embodiment of an event management system 300 of the present invention includes an event manager 310, event archive 320, event correlator 330, alarm rule store 340, and a response engine 350. In an exemplary embodiment of the present invention, an event manager 310, event archive 320, event correlator 330, and a response engine 350 are included on all nodes of the enterprise and the alarm rule store 340 is included on a central node allowing events to be stored and managed locally.

In an exemplary embodiment of the present invention, an event management system may, for example, receive event messages from point products, for example, throughout an enterprise. Events are managed on a node of the enterprise where the events are received by an event manager 310 located on the respective node. The event manager 310 may, for example, receive all events, maintain the states of previously sent events, maintain a list of subscriptions, and route events to the appropriate subscribers. In an exemplary embodiment of the present invention, the events and their state and the list of subscriptions may be stored locally.

Figure 4:
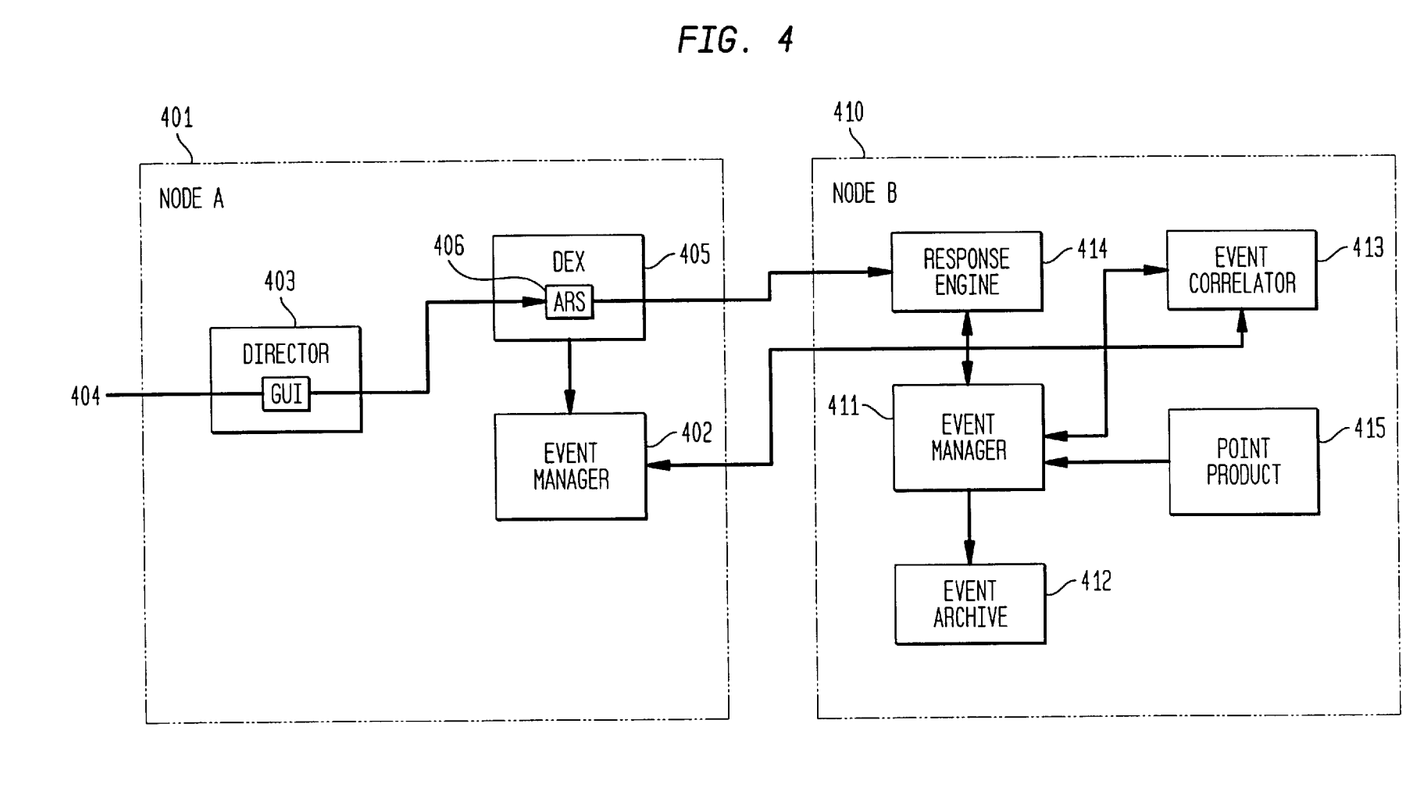
FIG. 4 shows an exemplary embodiment of event information communicated between a plurality of nodes of the event management system of the present invention.

As shown in FIG. 4, the event manager 402 of node a 401 and the event manager 411 of node b 410 also receive event information from the event correlator 413 of node b 410. The event manager 411 of node b 410 also provides events to the event correlator 413 on node b. The event manager 411 also receives event information from point product 415, where events are actually occurring. Event manager 402, 411 maintains, for example, the events and their associated state and a list of subscriptions. Each event manager may have a local memory data store, e.g., a blackboard, where statefull events are stored. The blackboard may be kept persistent in a file based storage, for recovery of the information across generations (process invocation of the event manager). The clients subscribing to events are responsible for reestablishing the respective subscriptions across new invocations of the event manager. Accordingly, the subscriptions may be maintained in memory. The local event archive is maintained for all the events received by the event manager. The event management system of the present invention also may correlate events from multiple nodes. In an exemplary embodiment of the present invention, the event management system provides views of events consolidated to single management stations or in views/categories that cross node boundaries.

The event management system of the present invention is structured to query or express outstanding interest in groups of events by criteria other than node through, for example, event subscription. Event subscription allows the specification of criteria on the contents of the fields of the event. Determining the events of interest to a particular process can be analogized, for example, to writing a database query that requests records matching criteria on various fields of the record. The request of the present invention differs from a normal database query in that it is not solely a request for data already in existence, but an ongoing request for a collection of events that have yet to occur or exist.

When a subscription is made for an event such as, for example, an event occurring at a point product 415, a subscription request is sent to event manager 411 on node b 410. The event manager 411 receives the request and adds this request to its list of outstanding requests which may be stored, for example, in memory. The event manager 411 checks outstanding events previously stored, for example, in a blackboard, to see if it matches the request criteria. Each matching event is forwarded, e.g., published, to the requester, e.g., the subscriber of the event. Any new events which are received and match the subscription criteria are also forwarded. This may continue until the subscription is canceled.

In an exemplary embodiment of the present invention, a subscription is assigned a unique ID when it is formed. The unique ID and a datagroup from which this request came, uniquely defines the subscription. A subscription is canceled by calling an API with a returned request handle from the original subscription. This results in sending a cancel message to the event manager with the respective request ID. The event manager can then match the cancel request to the original subscription and remove it from a processing queue of the event manager.

All events published on a node are received by the event manager of the node. The event manager also receives and maintains all requests sent by processes from its node and other nodes. Upon receipt of an event, the event manager also assigns an event ID. The event manager determines if the event is a condition and if so, the event manager checks, for example, a blackboard to determine if the event matches an existing condition. If so, the condition event is assigned a condition ID of the existing condition and applied as an update to the existing condition. Further, if archiving is enabled, the event is archived. In an exemplary embodiment of the present invention, for example, the archiving may include storing the event in a database such as a flat file archive. A separate file may be used for each calendar day. Events may be written to the archive for the day of the time stamp in the event as newline delimited records in the order in which they are received. The event manager also checks all outstanding subscription requests. For any event other than a condition update, if the received event matches the request, the event manager forwards the event to the requestor. In the case of an update to a condition, it is the event as updated that is matched against the request. Accordingly, it is the updated event that the event manager forwards to the requester.

Event filters describe identifying criteria for the events of interest and allow specification of various forms of comparison that can be specified for each of the fields of an event including key value pairs of the extended event structure. An event filter is, for example, a Boolean expression made up of subexpressions that compare a field of an event with a user specified value. Event filters are, for example, similar to the "WHERE" clause in Structured Query Language (SQL). The fundamental subexpression of an event filter is, for example, a phrase comparing a field of an event with a value, e.g., node=ptisun20. The subexpression node=ptisun20 means that the node field of the event must exactly match the string "ptisun20". Any of the fields of the event structure can be used as the node field is used in the example, with the exception of the keys field array and values field array which require a special syntax. For example, if one of the key value pairs added was:

| key | value |
|---|---|
| FileSystem | /usr, | an exact match filter for this key value pair would be keyfield.FileSystem="/usr". Further, testing for the existence of a key with any value could be done by testing that it not match a null value, e.g., keyfield.FileSystem !="". The event filters may be stored any place a text string could be stored, for example, in a configuration file such as a flat text file, in a database, in memory, as C source code (e.g., hard coded in a program), etc.

Filtering is also available on the values of key value pairs of the event. As in the earlier example, there may be a key "FileSystem" with an associated value that is the name of a specific file system. The desired events may only be those for a certain file system, for instance/usr. The filter mechanism for corresponding values of a key specifies the key and tests the associated value. A special syntax is used to distinguish keys from other fields of the event that allows a different name space for the keys from the predefined fields of the event. The syntax is "keyfield.[name]". An example testing for the value /usr of a key value pair would be, for example, keyfield.FileSystem=/usr.

In an exemplary embodiment of the present invention, the event filter may include comparison operators such as = and full regular expression match specified with the operator "like". A filter, for example, could be node=ptisun05. A filter matching all node values that follow a pattern of ptisun[#]

would be node like "ptisun[0-9]+". The following is an exemplary list of event filter comparison operators: >= (greater than or equal), <= (less than or equal), > (greater than), < (less than), = (equal), like (matches a regular expression), likeci (case insensitive string match), and != (not equal).

In an exemplary embodiment of the present invention, the following tokens, production rules, and event filter definition implemented using yet another compiler compiler (yacc) may be used.

%token NO_MORE_TOKENS
%token FILTER
%token <symp> NAME
%token <symp> FUNC_PART
%token <keywp> BOOLEAN
%token <keywp> COMPOP
%token <keywp> SEPARATOR
%token <keywp> LEFTPAREN
%token <keywp> RIGHTPAREN
/* get rid of expression grammar shift/reduce conflict */
%left BOOLEAN
%type <evalp> filter
%type <evalp> statement
%%
statement: FILTER filter NO_MORE_TOKENS
filter: NAME COMPOP NAME
　| FUNC_PART SEPARATOR NAME COMPOP NAME
　| NAME COMPOP FUNC_PART SEPARATOR NAME
　| filter BOOLEAN filter
　| LEFTPAREN filter RIGHTPAREN In an exemplary embodiment of the present invention, the event manager 411 may be implemented as a daemon (e.g., an agent program that continuously operates on a UNIX server and provides resources to client systems on the network). Upon receiving an event, the event manager 411 determines the disposition of the event, including whether it has already received the event and whether the event state has changed. The event manager 411 also writes the event to a local event archive 412 and routes the event to all clients that subscribe to the event content. For example, the event manager 411 may provide event information to the event correlator 413 and the event manager on a node 402. The event archive 412 may include an event archive service processor. The event archive 412 service processor reads events from the event archive. Subscribers may include any event correlator 413 instance that has an alarm rule subscribing to the event and, for example, a director containing a resource object or a product subscribing to update events about the contents in a central storage such as a data exchange service (DEX).

The event correlator 413 may include, for example, an event correlator service processor. The event correlator 413 implements a user-policy specified in a correlation rule. An alarm is a type of event that provides notification to subscribers of a significant condition or occurrence. The determination of an alarm may include the presence of a single event, the presence of a certain existing state(s) when another event occurs, or the recurrence of a particular event within a fixed time window. Further, an alarm may be a combination of the recurrence of a particular event within a fixed time window when certain state or states are present.

The events that determine if an alarm occurs may be due to events on the same node as the event correlator 413 or may come from one or more other nodes 401, 410. An alarm may also be associated with an automated response policy on declaration allowing a response engine 414 to handle any automated notification or correction of the alarm. The event correlator 413 can create, for example, an alarm, a modified version of a received event, or an entirely new event that can be correlated by another alarm rule.

Events may be correlated through an alarm rule. The basis of an alarm rule is the determination of the events that should be analyzed. Alarm rules can be created to define which single event or set of events represent a significant occurrence to which to respond. The alarm rule may include a description and logic describing the events that represent an occurrence and a definition of the response of the event management system to the occurrence. The result of correlation is the creation of one or more events. An alarm rule may be defined, for example, through the director 404.

An alarm rule includes, for example, a unique name which allows the rule to be referenced in other expressions by name. An alarm rule may also include a list of nodes (e.g., a distribution list) where the rule is to be run. The distribution list for a rule may be specified, for example, by a list of the nodes that should run the rule or a query that specifies the nodes that should run the rule The query may be, for example, "all", which equates to every node running an event correlator. Further, a query may run against a central storage such as the DEX 405 to determine certain criteria of the nodes in the enterprise, such as events available. An alarm rule also includes a definition of correlation filters.

Correlation filters are similar to the event filters used in event subscription as described in copending patent applications: Ser. No. 09/224,487, filed on Dec. 31, 1998 and entitled METHOD AND APPARATUS FOR A USER EXTENSIBLE EVENT STRUCTURE and Ser. No. 09/224,482, filed on Dec. 31, 1998 and entitled METHOD AND APPARATUS FOR THE DYNAMIC FILTERING AND ROUTING OF EVENTS; and Platinum Provision Common Services Reference Guide, version 1.08 (October 1998 Platinum technology, inc.) which are herein incorporated by reference in their entirety. The correlation filters, however, may be assigned a name and include qualifiers. The qualifiers, for example, may be used to correlate multiple events in a single rule. The qualifiers may also indicate that the filter is not applicable to the current input event. The alarm rule may also include logic testing filters and updating/sending events based on the results of the test, for example if/then/else logic that allows testing Boolean combinations of the filters and performing actions that result in events being generated.

In an exemplary embodiment of the present invention, the alarm rule uses the following format:
if (correlation filter expression)
{<correlation event expression 1>;
　<correlation event expression 2>;
　. . .
　<correlation event expression n>;}

In the above-mentioned exemplary format, the correlation filter expression follows the "If" statement and is enclosed in parentheses. This is a logical expression containing one or more correlation filter names connected by Boolean operators such as AND and OR. Further, additional parentheses can be included to control the order of evaluation. In the above-mentioned exemplary format, the correlation event expression is enclosed in a single set of curly braces. The beginning and ending curly brace may be on separate lines or each event definition may be on a separate line ending with a semicolon. The correlation filter expression defines what filters must be satisfied in order for the correlation to be performed. How a filter is satisfied (e.g., evaluated as true) depends on the qualification placed on the filter. For a standard filter, the current input event must match. For a count filter, the current event must complete a set of events received in a time window for the filter to be satisfied. Further, a conditionExists filter is satisfied if a given event was received in the past that indicates that a particular condition still exists. The correlation filter expression can specify criteria on a past and current event by any combination via a Boolean operator of these individual filters including the negation of it (e.g., the condition is not currently present, the count has not been completed, or the current event does not match).

For example, if f1 is a standard, unqualified filter that applies to the current event, the expression "if (f1)", indicates that the current event must match that filter for the correlation to be performed. Then if there was a second standard filter, f2, both filters could be tested for with the expression "if (f1 or f2)". In this expression, if the input event matched either f1 or f2, the correlation would be performed. The correlation filter expression may also include nested conditions such as a logical "if/else if" expression in a format similar to the following:

If (F1)
{<correlation event 1>;}
Else If (F2)
{<correlation event 2>;}

An alarm rule of the present invention can be used with or without logic. In the absence of any controlling logic, an action statement in the rule will be executed whenever an event is received. An event will be received whenever there is an event that matches any of the declared filters. The rule may be segmented into various groups of actions based on testing whether one or more of the declared filters in the rule is true, for example, by forming a Boolean expression using the names of the filters and testing its truth at any given time. For example, if there were three filters named A, B, and C, a test could be performed for (A and (B or C)). This would mean that the expression is true if filter A is true and filter B or C is true. This rule, for example, may be expressed as follows.

If (A and (B or C))
  SendModifedAlarm(-I 10);
else
  SendModifiedAlarm(-I 0);

In this example, different alarm levels are being set based on testing which filters are true.

In an exemplary embodiment of the present invention, there are four action statements, SendEvent, SendModifiedInputEvent, SendModifiedAlarm, and SendModifiedCondition supported in the event correlation rule syntax which send events. The action statement SendEvent starts with a newly created event and must have each mandatory field for the event supplied as an argument, with the exception of fields that can be assigned default values like time, node and agent node. Any event type can be submitted with this action. The action statement SendModifiedInputEvent uses the input event as a template for the output event, replacing only fields specified as arguments to SendModifiedInputEvent. The event time is updated to the current time, and if this causes a problem for a condition or alarm (conditions and alarms required that the event time>condition time), the time is set to, for example, the time of the input event (which already had to be greater than the condtion_time) plus one second. The action statement SendModifiedAlarm is built on top of SendModifiedInputEvent. Its only difference is that it only sends an alarm, e.g., it forces a set of the event type to alarm_set. It also handles creating an alarm from a discrete event which does not have a condition time, setting the condition time to the current time. The action statement SendModifiedCondition is the same as SendModifiedAlarm except the type is forced to be condition_set.

The qualifiers for a correlation filter may include, for example, ConditionExists, Count and CountDiscrete. The qualifier ConditionExists indicates that the filter should be applied to events already received by the time the current event was received. If a prior statefull event exists that matches the specified filter, the filter expression will be true. Otherwise it will be false. The qualifier Count is used to track the number of times a matching event happened within a specified time period. Its specification is count(number of times, time interval, filter). Upon firing the set is purged, so upon receipt of the next matching event the count will be zero. The time window may be scrolling in which the oldest matching events are dropped off the pending list as they differ from the most recently added event by the time interval specified. The qualifier CountDiscrete counts discrete events. It is the equivalent of Count with its filter modified to be, for example, filter_filter AND type=discrete.

Events can be retrieved from any node to where the alarm rule is running. In an exemplary embodiment of the present invention, the determination of where to run a rule may be dependent on the nature of the rule. If the rule specifies events only occurring on a local node, for example, then the rule needs to run on all nodes where such a correlation is desired. For example, if the rule was to perform some form of correlation for an event about the CPU usage of a machine and the filter did not specify a node, then the event correlator running the rule only receives events about CPU usage on the node where the subscription takes place. Accordingly, the filter and rule can be generic and applicable on each machine. Therefore the distribution list for the rule should include every node on which the respective correlation takes place.

A generic rule also allows a single definition to be applicable to the same type of problem on every host in the enterprise, thereby reducing the number of rules to maintain and configure. A generic rule allows the analysis and correction of the problem to be localized to where it occurs, e.g., on each node.

The alarm rule store 406 may include an alarm rule service processor that manages alarm rules and response policies stored in a central storage location such as the DEX 405. In an exemplary embodiment of the present invention, the DEX 405 is a central storage location for reusable information, including data configuration, product information, event information, security information, and rules. The DEX 405 may be a distributed, multi-platform, multi-data format, shared data store including a plurality of data stores, relational data, data locations, and files.

The response engine 414 executes a response policy. The response engine 414 includes a plurality of processes. The response policy is, for example, a logical expression containing a list of actions connected by logic statements that is invoked by a triggering alarm generated by the event correlator 413. Multiple actions can be defined and be performed in the response policy. In an exemplary embodiment of the present invention, the multiple actions may be in a listed sequence, or added with logic to make each action contingent upon the receipt of a return code of another action or a specified field sent in the alarm. The response policy may be created by defining a set of actions and composing an expression that references one or more of these actions in a logical sequence. The actions may be global and called by multiple response policies. In an exemplary embodiment of the present invention, the response engine 414 also adds information about the success of each action to the triggering alarm at the completion of each step. This may be accomplished, for example, by sending an update alarm event that updates the event with the sequential number of the step just completed, the type of the step (e.g. email/page), and in the event archive the name of the action step. This information may be accessed through a director.

In an exemplary embodiment of the present invention, the response engine 414 may include, for example, a first process, a second process, and a third process. The first process subscribes to events sent by an event correlator 413 running on the same node 410 as the response engine 414. Upon receipt of an alarm that has an associated response policy, the first process invokes the second process to perform the policy. The first process can invoke multiple instances of the second process depending upon the settings in configuration files associated with the respective processes. The second process performs an action requiring the sending of events and calls the third process to perform any other actions. The third process of the response engine 414 may also perform a response policy action requiring a call to the operating system, such as sending an email message, invoking a script, sending a page, writing a message to a file, or forwarding the event as a simple network management protocol (SNMP) trap.

In an exemplary embodiment of the present invention, the following tokens, production rules, and correlation language implemented using yacc may be used.

```
%union {
    struct FilterEvalNode *evalp;
    struct FilterSymTab *symp;
    struct keyword_table *keywp;
    struct ARG_LIST *argp;}
%ononassoc LOWER_THAN_ELSE
%ononassoc <symp> ELSE
%token NO_MORE_TOKENS
%token <symp> DECLARED_FILTER
%token <symp> ACTION_FUNC
%token ALARM
%token <symp> NAME
%token <keywp> IF
%token <keywp> CONDITION
%token <keywp> CONDITIONEXISTS
%token <keywp> BOOLEAN
%token <keywp> UNARYOP
%token <keywp> LEFTPAREN
%token <keywp> RIGHTPAREN
%token <keywp> LEFTCURLYBRACE
%token <keywp> RIGHTCURLYBRACE
%token <keywp> ENDSTATEMENT
%token <keywp> ASSIGN
%token <keywp> COUNTDISCRETE
%token <keywp> COUNT
%token <keywp> SECONDS
%token <keywp> MINUTES
%token <keywp> HOURS
%token <keywp> DAYS
%token <keywp> COMMA
%left BOOLEAN
%left UNARYOP
%type <evalp> Actions
%type <evaip> Action
%type <argp> ArgList
%type <argp> Arg
%type <evalp> AlarmPrograms
%type <evalp> AlarmProgram
%type <evalp> filter
%type <evalp> statement
%type <evalp> declaredFilterExpr
%type <symp> timeInterval
%type <symp> nameAsInteger
%type <evalp> countType
%type <keywp> maybeNOT
```

| | |
|---|---|
| statement: | ALARM AlarmPrograms NO_MORE_TOKENS |
| AlarmPrograms: | AlarmPrograms AlarmProgram |
| | / AlarmProgram |
| | / UNARYOP AlarmProgram |
| AlarmProgram: | NAME ASSIGN filter |
| | / NAME ASSIGN maybeNOT CONDITION filter |
| | / NAME ASSIGN maybeNOT CONDITIONEXISTS LEFTPAREN filter |
| | / NAME ASSIGN maybeNOT countType LEFTPAREN NAME COMMA timeInterval COMMA filter RIGHTPAREN |
| | / Action |
| Actions: | Actions Action |
| Action: | ACTION_FUNC LEFTPAREN ArgList RIGHTPAREN ENDSTATEMENT |
| | / IF LEFTPAREN declaredFilterExpr RIGHTPAREN Action |
| | %prec LOWER_THAN_ELSE |
| | / IF LEFTPAREN declaredFilterExpr RIGHTPAREN Action ELSE Action |
| | / LEFTCURLYBRACEActions RIGHTCURLYBRACE |
| | / ENDSTATEMENT |
| ArgList: | ArgList Arg |
| | / ArgListCOMMAArg |
| | / Arg |
| Arg: | NAME |
| countType: | COUNT |
| | / COUNTDISCRETE |
| timeInterval: | nameAsInteger |
| | / nameAsInteger SECONDS |
| | / nameAsInteger MINUTES |
| | / nameAsInteger HOURS |
| | / nameAsInteger DAYS |
| nameAsInteger: | NAME |
| declaredFilterExpr: | DECLARED_FILTER |
| | / declaredFilterExpr BOOLEAN declaredFilterExpr |
| | / LEFTPAREN declaredFilterExpr RIGHTPAREN |
| | / UNARYOP declaredFilterExpr |
| maybeNOT: | /* empty */ |
| | / UNARYOP |

The event management system of the present invention provides hierarchical consolidation on a subscription basis. For example, a director 403 has a consolidated view of events in the enterprise based on subscribing to the various nodes providing event information. The event information may be presented as a single, unified view, but can be based on multiple subscriptions to different event sources. The configuration of correlation rules allows a set of correlation rules to implement a hierarchy of correlation or consolidation by using the same subscription mechanism within the rules that the director 403 may use to consolidate events from multiple sources. For example, if an application running on node A relies on databases on node B and node C, a single rule monitoring this application can consolidate events about the application on node A, the ability to maintain connectivity to nodes B and C, and the status of the databases on nodes B and C. This may be accomplished by configuring the filters in the rule to specify these sources.

Further, consolidating all of the errors from one node to another node can be similarly implemented with suitable configured correlation rules. For example, utilizing a rule, node A can consolidate problems from nodes B and C. The output of the event correlator with respect to locally generated events may be, for example, a consolidation of the events of the node into alarms. According to an embodiment of the present invention, the event correlator on node A can subscribe to the alarms that are generated on nodes B and C. This effectively brings all the declared problems to node A. The declared problems then may be re-declared as alarms on node A, based on the contents of the rule, or could be used in the rule to determine certain types of correlation across the problems reported on nodes B, C, and A. Re-declaring problems would allow a redundant local copy or a subscription that only specifies a respective node to allow one to view the problems spanning all three nodes.

Accordingly, the hierarchical consolidation provided by the event management system of the present invention does not require any additional configuration outside of the rule itself. No need exists to maintain the relationships outside of the relationships between rules. The hierarchy can effectively vary on a rule basis. One node can be the consolidation point for certain problems while another node can be the consolidation node for a different set with both of these nodes contributing to each other's consolidation.

The event management system of the present invention can dynamically, e.g., while the event correlator is running, determine whether a rule was changed, added or deleted. The user-defined alarm rules are maintained, for example, in an alarm rule store (ARS) 406 in a central store in the DEX 405. The editing or addition of rules may be performed via a director 403.

Figure 5:
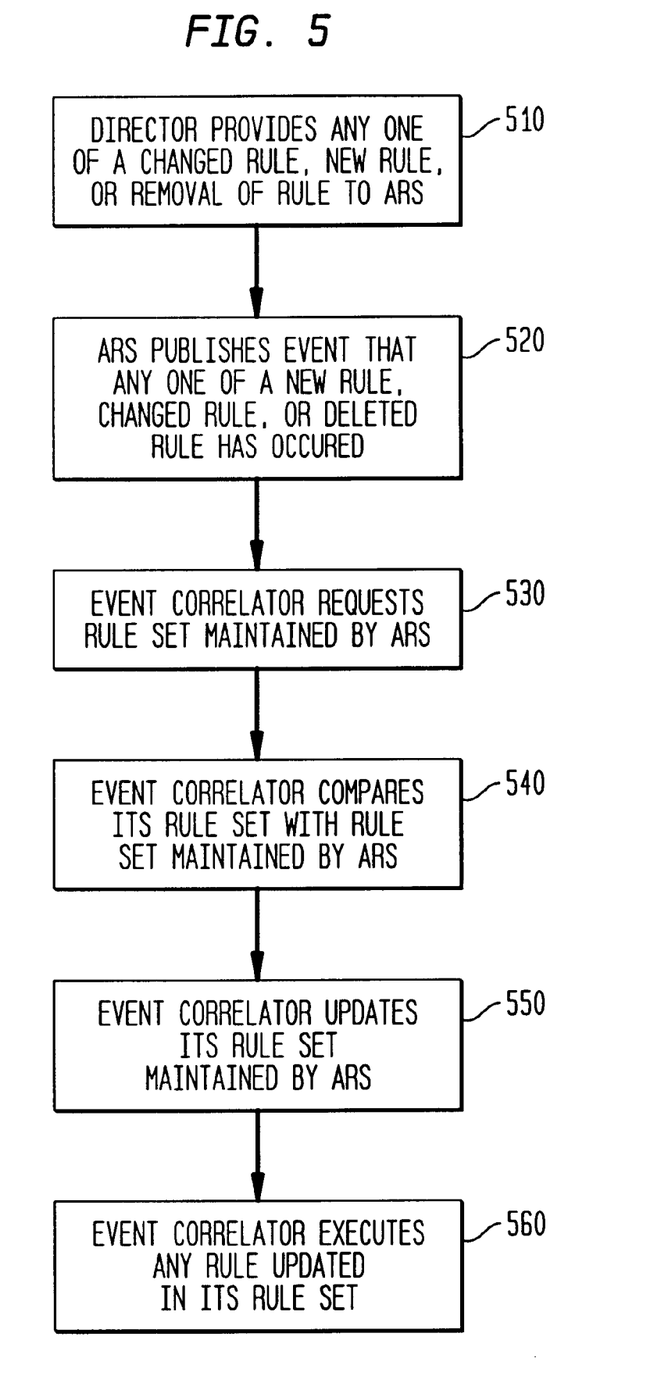
FIG. 5 shows an exemplary embodiment of a flow diagram of dynamic execution of a newly added or changed rule for event correlation according to the present invention.

FIG. 5 illustrates an exemplary flowchart for dynamic execution of added or modified rules. As shown in FIG. 5, in step 510 the director 403 queries the ARS 406 for rules and writes any changes back to the ARS 406. The ARS 406 publishes an event whenever it updates the rules in the ARS 406. The event correlator 413 on each of the nodes subscribes for this event. Upon receiving this event, each of the event correlators 413 knows to contact the ARS 406 to determine if the rules they run have been updated. For example, the event published by the ARS 406 may indicate that the rule store has changed.

In step 530, the respective event correlator 413 contacts the ARS 406, requesting its rule set. In step 540, the event correlator 413 then compares its current set of rules that it is running to the rules received form the ARS 406. In step 550, any rules that are unchanged need no action, any new rules need to be added to the rule set of the respective event correlator, and any rules that have been deleted from the ARS 406 need to be removed from the rule set of the respective event correlator. In step 560, any changed or added rules to the rule set of the respective event correlator will be executed. Further, the rule set may be distributed across multiple correlators. Accordingly, correlation done by any particular node can be rerouted to another node by changing the rules distribution list.

A rule can be added to the event management system according to an embodiment of the present invention dynamically by adding a rule to a running event correlator since each rule maintains its own event stream. Adding or removing a subscription of a rule does not impact any other rule. A new rule may result in the event correlator receiving events it previously did not receive. These events will not change how any other rule is evaluated as those rules will not see the new events. Similarly, deleting a rule will result in the event correlator receiving fewer events than it did before. Not receiving these events, however, will not change the evaluation of any other rule being run by the event correlator. As each rule specifies an independent set of events to receive its own event stream, changes to a rule are isolated and will not impact any other rule.

The rule would need to be parsed and the appropriate subscriptions formed so that the rule receives appropriate events. A rule also can be deleted from the event management system dynamically by canceling the outstanding subscriptions for the rule, removing the memory structures utilized in tracking the state of the rule and its evaluation tree, and removing alarms that the rule generated. A list of user-defined alarm rules is maintained by the event management system in an alarm rule store. A list of alarms by rule including the name of the event is maintained by the event management system, for example, in a blackboard.

The event management system of the present invention allows the determination of an input event and alarm rule that resulted in the respective alarm. In an exemplary embodiment of the present invention, the event management system keeps track of the respective alarms that are associated with the respective rules. The relationship of an alarm to what causes it can be determined from an analysis of the rule. For example, an n-to-1 mapping needs to be made between input events and the alarm, where n is the number of input events. In the simplest case, a single input event (n=1), maps to the creation of one alarm. Accordingly, the input event that caused the alarm is readily determined since only one input event is associated with the alarm.

When condition filters or count filters are in use, however, the mapping becomes n-to-1. The mapping can be represented, for example, as a tuple of information relating a plurality of input event IDs to the output alarm ID. The determination of what events were considered may include, for example, the current input event at the time of generating the rule. The determination of what events were considered may also include events stored by any of the statefull events (e.g., ConditionExists or Count based filters which may specify one or more events that have already occurred) that were also in the controlling "if" block that resulted in the rule action to generate an alarm. In an exemplary embodiment of the present invention, all of these events have a single unique ID except the generated alarm. The alarm, however, may not have a unique ID until the event has been processed by an event manager. Thus, in the absence of a unique identifier for the output alarm, a full multi-part key of the alarm may be used to allow the n-to-1 relationship record to be written out. Accordingly, the input event and alarm rule that resulted in the respective alarm may be determined.

Alternatively, in the absence of a unique identifier for the output alarm, postponing the output of the n-to-1 relationship record until the alarm event is received back by the rule may allow its corresponding unique ID to be known. The n-to-1 relationship record may then be written out as a result of being provided with the corresponding unique ID. Accordingly, the input event and alarm rule that resulted in the respective alarm may be determined.

Alternatively, a unique submitter assigned ID may be used at the time of the creation of an event such as an alarm. The submitter assigned ID may be used instead of an event manager assigned unique ID, to allow the n-to-1 relationship record to be written out. Accordingly, the input event and alarm rule the resulted in the respective alarm may be determined.

In any event, the output, e.g., n-to-1 relationship record, may be stored as a table and maintained as part of the event archive. Accordingly, the event archive service processor could be augmented to provide a query for related events that would use the event archive to obtain information provided by the n-to-1 relationship record.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. An event management system comprising:

an event manager, the event manager receiving one or more subscription requests for one or more event data from one or more subscribers, the event manager receiving one or more events and if the one or more events matches an existing condition, applying the one or more events as an update to the existing condition, the event manager further routing the one or more event data to the one or more subscribers;

an alarm rule store, the alarm rule store storing alarm rules;

an event correlator coupled to the event manager and to the alarm rule store, the event correlator correlating the one or more event data provided by the event manager based on the alarm rules, the event correlator further dynamically determining whether a rule was changed, added or deleted to dynamically execute the added or modified rule; and a response engine coupled to the event manager, the response engine executing a response policy based on the correlation of events by the event correlator.

2. The event management system according to claim 1, wherein the event manager includes a plurality of event managers, wherein each of the plurality of event managers is on a respective node of a network.

3. The event management system according to claim 2, wherein the event correlator correlates at least two events respectively provided by each of at least two of the plurality of event managers.

4. The event management system according to claim 1, further comprising an event archive coupled to the event manager, the event archive including an event archive file and an event archive service processor, wherein the event manager stores event data in the event archive file and the event archive service processor processes the event data in the event archive file.

5. A method for dynamically executing at least one of a modified rule and a new rule, the method comprising the following steps:

publishing a rule event in response to receiving at least one of the modified rule and the new rule;

requesting a first rule set from a storage device in response to receiving the published rule event;

changing any of the respective rules from a second rule set that have been changed in the first rule set, adding a rule to the second rule set that has been added to the first rule set, and removing a rule to the second rule set that has been removed from the first rule set; and executing the rules of the second rule set that have been one of changed and added.

6. A method of dynamically correlating events comprising:

receiving one or more subscriptions to one or more events;

receiving event data;

determining a subscriber of the event data from the one or more subscriptions;

routing the event data to the subscriber;

dynamically determining whether a rule was changed, added or deleted; and if a rule was changed or added executing the added or changed rule, wherein the subscriber receiving the event data runs one or more predetermined rules associated with the event data.

7. The method of dynamically correlating events as claimed in claim 6, wherein the receiving one or more subscriptions includes receiving the one more subscriptions from a plurality of distributed computer nodes.

8. The method of dynamically correlating events as claimed in claim 6, wherein the receiving one or more subscriptions includes receiving one or more subscriptions to one or more events, the events including one or more new events added dynamically by creating one or more key value pairs to define the one or more new events.

9. The method of dynamically correlating events as claimed in claim 6, further including:

maintaining a list of the one or more subscriptions and corresponding subscribers.

10. The method of dynamically correlating events as claimed in claim 9, further including:

removing a selected subscription from the list of the one or more subscriptions when the selected subscription is canceled.

11. The method of dynamically correlating events as claimed in claim 6, wherein the one or more subscriptions include one or more subscriptions to an occurrence of an event matching one or more predetermined criteria.

* * * * *